US012147732B2

United States Patent
Lange et al.

(10) Patent No.: US 12,147,732 B2
(45) Date of Patent: *Nov. 19, 2024

(54) ANALYZING GRAPHICAL USER INTERFACES TO FACILITATE AUTOMATIC INTERACTION

(71) Applicant: GOOGLE LLC, Mountain View, CA (US)

(72) Inventors: Joseph Lange, Zurich (CH); Asier Aguirre, Adliswil (CH); Olivier Siegenthaler, Zurich (CH); Michal Pryt, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/234,760

(22) Filed: Aug. 16, 2023

(65) Prior Publication Data

US 2023/0393810 A1    Dec. 7, 2023

Related U.S. Application Data

(63) Continuation of application No. 17/251,468, filed as application No. PCT/US2020/016143 on Jan. 31, 2020, now Pat. No. 11,775,254.

(51) Int. Cl.
*G06F 3/16* (2006.01)
*G06T 7/70* (2017.01)
(Continued)

(52) U.S. Cl.
CPC ............... *G06F 3/167* (2013.01); *G06T 7/70* (2017.01); *G06V 20/00* (2022.01); *G10L 15/26* (2013.01); *G06T 2200/24* (2013.01)

(58) Field of Classification Search
CPC ....... G06F 3/167; G06T 7/70; G06T 2200/24; G06V 20/00; G10L 15/26; G10L 15/1822; G10L 15/22
See application file for complete search history.

(56) References Cited

U.S. PATENT DOCUMENTS 8,306,255 B1    11/2012  Degnan
9,954,729 B1    4/2018   Nolan et al.
(Continued)

FOREIGN PATENT DOCUMENTS

CN        109359056        2/2019

OTHER PUBLICATIONS

Intellectual Property India; Hearing Notice issued in Application No. 202227041278; 3 pages; dated Mar. 11, 2024.
(Continued)

*Primary Examiner* — Angie Badawi
(74) *Attorney, Agent, or Firm* — Gray Ice Higdon

(57) ABSTRACT

Implementations are described herein for analyzing existing graphical user interfaces ("GUIs") to facilitate automatic interaction with those GUIs, e.g., by automated assistants or via other user interfaces, with minimal effort from the hosts of those GUIs. For example, in various implementations, a user intent to interact with a particular GUI may be determined based at least in part on a free-form natural language input. Based on the user intent, a target visual cue to be located in the GUI may be identified, and object recognition processing may be performed on a screenshot of the GUI to determine a location of a detected instance of the target visual cue in the screenshot. Based on the location of the detected instance of the target visual cue, an interactive element of the GUI may be identified and automatically populate with data determined from the user intent.

17 Claims, 10 Drawing Sheets

(51) Int. Cl.
  *G06V 20/00* (2022.01)
  *G10L 15/26* (2006.01)

(56) References Cited

U.S. PATENT DOCUMENTS

| | | | |
|---|---|---|---|
| 10,037,552 | B1 | 7/2018 | Lorimor et al. |
| 10,489,126 | B2 | 11/2019 | Kumar et al. |
| 10,944,845 | B1 | 3/2021 | Gibson et al. |
| 2003/0164855 | A1 | 9/2003 | Grant et al. |
| 2015/0149168 | A1 | 5/2015 | Stent et al. |
| 2017/0060368 | A1 | 3/2017 | Kochura |
| 2017/0084273 | A1 | 3/2017 | Zohar et al. |
| 2018/0203674 | A1 | 7/2018 | Dayanandan |
| 2019/0087691 | A1 | 3/2019 | Jelveh |
| 2019/0243883 | A1 | 8/2019 | Vagen |
| 2020/0020334 | A1 | 1/2020 | Kang et al. |
| 2020/0034399 | A1 | 1/2020 | Beno et al. |
| 2020/0326832 | A1 | 10/2020 | Lee et al. |
| 2021/0081475 | A1 | 3/2021 | Pham et al. |
| 2022/0050661 | A1 | 2/2022 | Lange et al. |

OTHER PUBLICATIONS

Intellectual Property India; Examination Report issued in Application No. 202227041278; 5 pages; dated Nov. 9, 2022.

Kandhari, M. et al., "A Voice Controlled E-Commerce Web Application;" 2018 IEEE 9th Annual Information Technology, Electronics and Mobile Communication Conference (IEMCON); 7 pages; Nov. 1, 2018.

Vasuki, R. et al., "Smart Role of Deep Learning in Google Duplex Through Artificial Intelligence;" International Journal of Research and Analytical Reviews (IJRAR); 4 pages; Jun. 1, 2019.

European Patent Office; International Search Report and Written Opinion of PCT Ser. No. PCT/US2020/016143; 12 pages; dated Oct. 19, 2020.

European Patent Office, Intention to Grant issued in Application No. 20708966.5; 54 pages; dated May 27, 2024.

ANALYZING GRAPHICAL USER INTERFACES TO FACILITATE AUTOMATIC INTERACTION

BACKGROUND

Humans may engage in human-to-computer dialogs with interactive software applications referred to herein as "automated assistants" (also referred to as "chatbots," "interactive personal assistants," "intelligent personal assistants," "personal voice assistants," "conversational agents," "virtual assistants," etc.). For example, humans (which when they interact with automated assistants may be referred to as "users") may provide commands, queries, and/or requests (collectively referred to herein as "queries") using free form natural language input which may include vocal utterances converted into text and then processed and/or typed free form natural language input. Automated assistants may perform various types of processing on the natural language input, such as natural language processing, syntactic processing, semantic processing, etc., in order to identify and respond to the user's intent.

Automated assistants may interact with third party software agents, or "third party agents," in order to respond to some types of user intents to which the automated assistant itself is unable to respond fully. For example, vendors such as restaurants, ride share services, and so forth, may design their own third party agents that are configured to interact with an application programming interface ("API") of an automated assistant, e.g., so that the automated assistant can act as a liaison between the user and the third party agent. However, this development paradigm can be slow to scale. Each vendor must first create a third party agent that is compatible with the automated assistant's API. This may require more resources and/or technical sophistication than many vendors may have at their disposal. Moreover, many vendors already have built interactive webpages and/or mobile applications ("apps") that users can interact with to procure various items and/or services. Requiring these vendors to design yet another interface that is compatible with automated assistants may result in what appears, at least from the vendor's perspective, to be duplication of efforts.

SUMMARY

Techniques are described herein for analyzing existing interactive graphical user interfaces ("GUI") to facilitate automatic engagement with those GUIs, e.g., by automated assistants, with little or no effort from the creators and/or hosts of those GUIs (e.g., vendors). For example, in various implementations, techniques described herein may be used to abstract, validate, maintain, generalize, extend and/or distribute individual actions and "scripts" of actions (i.e. sequences of actions) that are (re)useable to navigate through portions of various interactive GUIs. For example, in some implementations, techniques described herein may be employed to enable users to engage with an automated assistant (via a spoken or typed dialog session) to interact with the third party website while a webpage of the third party web site is open.

Suppose a user navigates a web browser to a particular retailer's website, and once the website is open on the user's device, the user could submits a spoken request, e.g., to an automated assistant, "Search for energy-efficient dishwashers." In various implementations, a previously-generated script may be associated with that website/webpage and/or with the user's intent to search that website/webpage, e.g., in a database available to the automated assistant. The script may be executed with the parameters provided in the user's free-form natural language input (intent=search <website>, parameter="energy-efficient dishwashers") to cause a search field on the webpage to be automatically populated with the parameters. To maintain an intuitive and good user experience, the user may even see the search field opened and/or populated with automatically "typed" text. The search may be submitted, just as though the user had manually typed the search parameters into the search field and pressed submit.

The scripts mentioned above may be generated automatically, e.g., with little or no human intervention, which provides a practical way to scale an automated assistant's ability to automatically navigate across myriad GUIs. These scripts may be generated "offline" or in "real time," e.g., as a user uses an automated assistant to attempt to interact with a heretofore unknown webpage. In some implementations, the scripts may be generated by attempting to resolve a user's intent vis-à-vis a GUI that is active while the user submits a free-form natural language input, e.g., spoken or typed. Additionally or alternatively, in some implementations, the scripts may be generated in batches, e.g., with lists of GUIs (e.g., lists of uniform resource locators, or "URLs," associated with webpages) and free-form natural language inputs for which resolution should be attempted on those GUIs.

In some implementations, a free-form natural language input may be analyzed to determine a user intent to interact with a particular GUI, such as a webpage. In some implementations, this may occur while a particular GUI is rendered on a computing device, e.g., automatically or in response to a user request. In some such implementations, the active GUI may be used in conjunction with the free-form natural language input to determine the user intent. For example, the free-form natural language input may simply be "search for energy-efficient dishwashers," which by itself may either be difficult for an automated assistant to resolve without further information, or may simply be resolved by performing a default/general purpose search engine search. The fact that the particular GUI is active provides additional context, however. This additional context may be used to resolve the user intent to submit the search using a search interface provided by the active GUI.

Based on the user intent (e.g., "search"), one or more target visual cues may be identified, e.g., from a lookup table or other database, that are known to be associated with the user intent. Target visual cues may take various forms, such as common graphical icons, common arrangement of graphical elements relative to other graphical elements (which may be the case for date input fields or movie theater seat selection interfaces), For example, many webpages have a search interface that is often denoted visually using a magnifying glass symbol. If a user requests a search, then the magnifying glass may be the target visual cue. Many other visual cues are contemplated, such as calendar icons for date-entry fields, humanoid icons for login and/or person-count fields, etc. Whichever the case, in some implementations, object recognition processing may be performed on a screenshot (e.g., bitmap) of the GUI to determine a location of a detected instance of the target visual cue. In other implementations, visual cues may be searched for by looking at, for instance, source code, object code, and/or markup language underlying the GUI.

Once the location of the detected instance of the targeted visual cue is determined, it may be used to identify an interactive element of the GUI that should be auto-populated with data that is determined from the user intent. For example, in some implementations, a document object model ("DOM") underlying a webpage may be analyzed to determine, spatially, where various interactive elements are rendered on a display. Various heuristics may be employed to match a particular interactive element with the determined location of the detected instance of the targeted visual cue. Once this match is made, the interactive element may be automatically-populated with data determined from the user intent, and a submission mechanism (e.g., a "submit" button) may be triggered to transition to the next state of the GUI.

In some implementations, the outcome of this GUI transition may be analyzed to validate the success or failure of techniques described herein. For example, with many interactive webpages, data input into interactive elements is submitted as HTTP data and is ultimately presented as part of the URL of the next webpage. More generally, may webpages and/or other GUIs may include visual output that tends to validate the success or failure of the auto-population of the interactive elements, e.g., as a string above search results indicating what the search was. Whichever the case, these outcomes can serve as strong signals for validating the success of techniques described herein. In some implementations, therefore, the outcomes or data indicative thereof may be used to train, for instance, a machine learning model used to locate a target visual cue in a screenshot, or to update heuristics (or another machine learning model) used to match the target visual cue's location to an interactive element. Or, in some cases, a script that is usable to navigate through the same GUI may be generated only upon verification of a successful outcome.

Techniques described herein give rise to various technical advantages. Causing text or other data to be input into an already-rendered graphical element automatically, so that a user can see it being input, provides an intuitive and user-friendly way to help users understand how they are interacting with their computing device. Also, the GUI need not be reloaded while the data is input automatically, which can be especially beneficial when the GUI is a webpage (e.g., because there will be no blinking associated with reloading the webpage). Avoidance of GUI reload also speeds up user interaction with the GUI, especially when the GUI is a webpage.

Another advantage of techniques described herein is that a state of the GUI is preserved while the data is being input automatically. Users often perform searches in stages, with each stage incrementally narrowing/filtering the search, until a manageable number of search results are presented. With techniques described herein, the existing GUI and its state—including any previously-applied filters—may be preserved while data is automatically input and submitted. By contrast, the GUI's state might be lost if, for instance, the GUI were a webpage and the web browser used to render the GUI were redirected to a new URL with the search query incorporated, rather than inputting the search query into a search field using techniques described herein. In the former case, there is no guarantee that previously-applied filters would remain in place (unless, for instance, a website is configured to preserve previously-applied filters using some other mechanism).

Also, automatic scripts generated using techniques described herein can be periodically re-validated and updated if they no longer work. Consequently, so as GUIs evolve—especially frequent in the webpage domain—so too do scripts for automatically interacting with those webpages.

In some implementations, a method performed by one or more processors is provided that includes: determining a user intent to interact with a particular graphical user interface ("GUI") based at least in part on a free-form natural language input; based on the user intent, identifying a target visual cue to be located in the GUI; performing object recognition processing on a screenshot of the GUI to determine a location of a detected instance of the target visual cue in the screenshot; based on the location of the detected instance of the target visual cue, identifying an interactive element of the GUI; and automatically populating the identified interactive element with data determined from the user intent.

In various implementations, the GUI may take the form of an interactive webpage or a GUI of an application written in any number of programming languages, such as C, C++, Python, Java, C#, etc. In various implementations in which the GUI is an interactive webpage, the interactive element of the GUI may be identified by comparing a document object model ("DOM") of the interactive webpage with the location of the detected instance of the target visual cue.

In various implementations, the method may further include automatically submitting the data determined from the user intent; and receiving a subsequent webpage that is generated at least in part on the data determined from the user intent. In various implementations, the method may further include searching a uniform resource locator ("URL") or content of the subsequent webpage to determine an outcome of the automatic submitting. In various implementations, the object recognition may be performed using a machine learning model, and the method further includes training the machine learning model based on the outcome of the automatic submitting.

In various implementations, the free-form natural language input takes the form of a speech input captured at a microphone, and the method further includes performing speech recognition processing on the speech input to generate textual output. In various implementations, the object recognition is performed using a convolutional neural network. In various implementations, the user intent comprises submission of a search query using the GUI, and the target visual cue comprises a magnifying glass.

In various implementations, the method further includes generating, based on the identified interactive element, a script that is subsequently executable in association with the GUI and a subsequent free-form natural language input to trigger automatic population of the identified interactive element with data determined from a subsequent user intent determined from the subsequent free-form natural language input and submission of the data determined from the user intent via the GUI. In some such implementations, the subsequent automatic population and submission is performed without one or more of identifying the target visual cue, performing the object recognition, or identifying the interactive element of the GUI. In various implementations, the method further includes validating that submission of the data determined from the user intent resulted in a desired outcome, wherein the script is generated based on the validating.

In addition, some implementations include one or more processors of one or more computing devices, where the one or more processors are operable to execute instructions stored in associated memory, and where the instructions are configured to cause performance of any of the aforementioned methods. Some implementations also include one or more transitory and/or non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
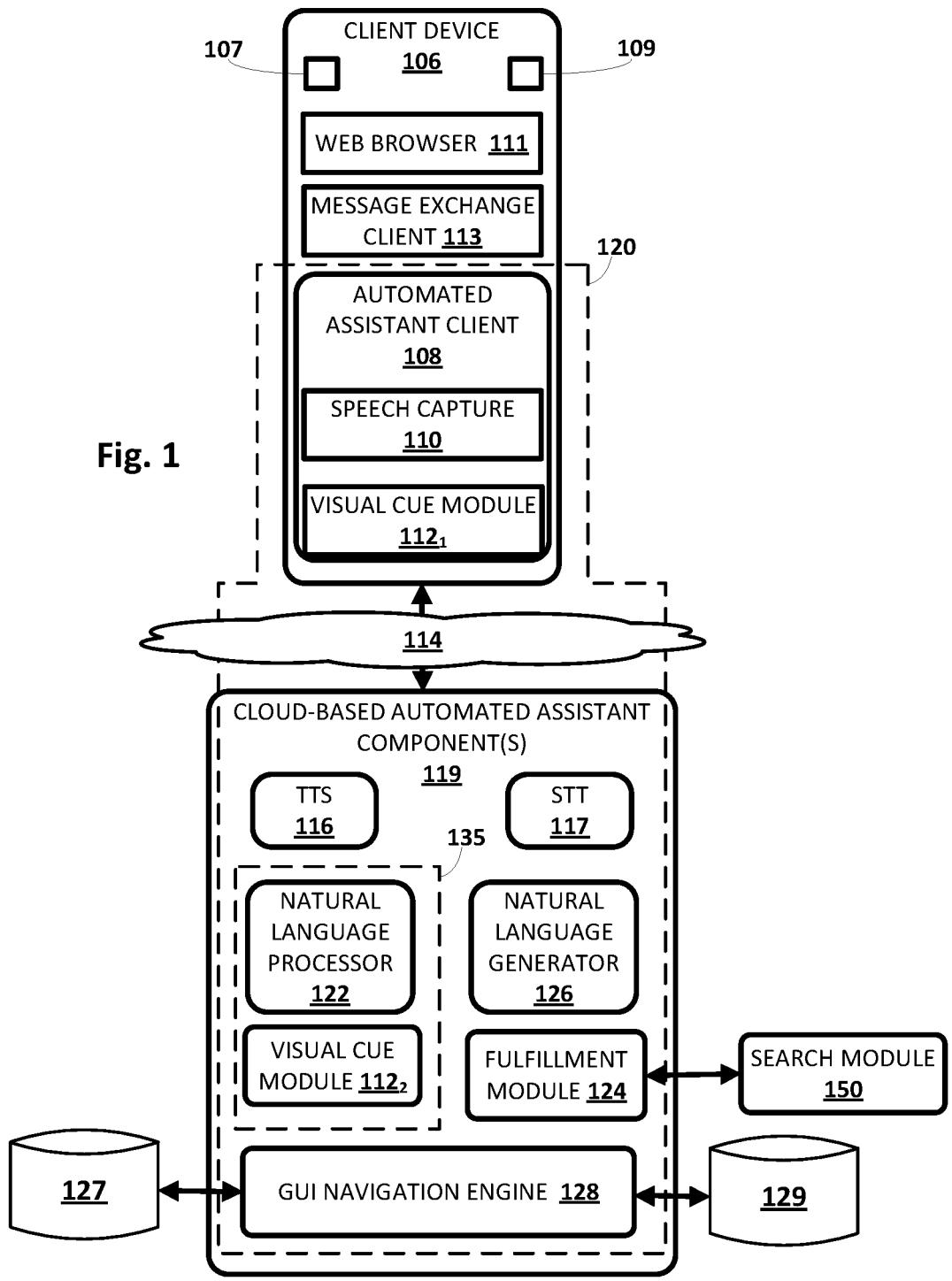
FIG. 1 is a block diagram of an example environment in which implementations disclosed herein may be implemented.

Now turning to FIG. 1, an example environment in which techniques disclosed herein may be implemented is illustrated. The example environment includes one or more client computing devices 106. Each client device 106 may execute a respective instance of an automated assistant client 108, which may also be referred to herein as a "client portion" of an automated assistant. One or more cloud-based automated assistant components 119, which may also be referred to herein collectively as a "server portion" of an automated assistant, may be implemented on one or more computing systems (collectively referred to as a "cloud" computing system) that are communicatively coupled to client devices 106 via one or more local and/or wide area networks (e.g., the Internet) indicated generally at 114.

In various implementations, an instance of an automated assistant client 108, by way of its interactions with one or more cloud-based automated assistant components 119, may form what appears to be, from the user's perspective, a logical instance of an automated assistant 120 with which the user may engage in a human-to-computer dialog. One instance of such an automated assistant 120 is depicted in FIG. 1 in dashed line. It thus should be understood that each user that engages with an automated assistant client 108 executing on a client device 106 may, in effect, engage with his or her own logical instance of an automated assistant 120. For the sakes of brevity and simplicity, the term "automated assistant" as used herein as "serving" a particular user will refer to the combination of an automated assistant client 108 executing on a client device 106 operated by the user and one or more cloud-based automated assistant components 119 (which may be shared amongst multiple automated assistant clients 108). It should also be understood that in some implementations, automated assistant 120 may respond to a request from any user regardless of whether the user is actually "served" by that particular instance of automated assistant 120.

The one or more client devices 106 may include, for example, one or more of: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker (which in some cases may include a vision sensor), a smart appliance such as a smart television (or a standard television equipped with a networked dongle with automated assistant capabilities), and/or a wearable apparatus of the user that includes a computing device (e.g., a watch of the user having a computing device, glasses of the user having a computing device, a virtual or augmented reality computing device). Additional and/or alternative client computing devices may be provided. Some client devices 106, such as standalone interactive speakers (or "smart speakers"), may take the form of assistant devices that are primarily designed to facilitate dialog between users and automated assistant 120. Some such assistant devices may take the form of a standalone interactive speaker with an attached display, which may or may not be a touchscreen display.

In some implementations, client device 106 may be equipped with one or more vision sensors 107 having one or more fields of view, although this is not required. Vision sensor(s) 107 may take various forms, such as digital cameras, passive infrared ("PIR") sensors, stereoscopic cameras, RGBd cameras, etc. The one or more vision sensors 107 may be used to capture image frames (still images or video) of an environment in which client device 106 is deployed. These image frames may then be analyzed, e.g., by a visual cue module $112_1$, to detect user-provided visual cues contained in the image frames. These visual cues may include but are not limited to hand gestures, gazes towards particular reference points, facial expressions, predefined movements by users, etc. These detected visual cues may be used for various purposes, such as invoking automated assistant 120 and/or causing automated assistant 120 to perform various actions.

As described in more detail herein, automated assistant 120 engages in human-to-computer dialog sessions with one or more users via user interface input and output devices of one or more client devices 106. In some implementations, automated assistant 120 may engage in a human-to-computer dialog session with a user in response to user interface input provided by the user via one or more user interface input devices of one of the client devices 106. In some of those implementations, the user interface input is explicitly directed to automated assistant 120. For example, a user may verbally provide (e.g., type, speak) a predetermined invocation phrase, such as "OK, Assistant," or "Hey, Assistant." When spoken, this verbal input may be captured by a microphone 109 and may cause automated assistant 120 to begin actively listening or monitoring typed text. Additionally or alternatively, in some implementations, automated assistant 120 may be invoked based on one or more detected visual cues, alone or in combination with oral invocation phrases.

In some implementations, automated assistant 120 may engage in a human-to-computer dialog session in response to user interface input, even when that user interface input is not explicitly directed to automated assistant 120. For example, automated assistant 120 may examine the contents of user interface input and engage in a dialog session in response to certain terms being present in the user interface input and/or based on other cues. In many implementations, automated assistant 120 may utilize speech recognition to convert speech utterances from users into text, and respond to the text accordingly, e.g., by providing search results, general information, and/or taking one or more responsive actions (e.g., playing media, launching a game, ordering food, etc.). In some implementations, the automated assistant 120 can additionally or alternatively respond to utterances without converting the utterances into text. For example, the automated assistant 120 can convert voice input into an embedding, into entity representation(s) (that indicate entity/entities present in the voice input), and/or other "non-textual" representation and operate on such non-textual representation. Accordingly, implementations described herein as operating based on text converted from voice input may additionally and/or alternatively operate on the voice input directly and/or other non-textual representations of the voice input.

Each of client computing device 106 and computing device(s) operating cloud-based automated assistant components 119 may include one or more memories for storage of data and software applications, one or more processors for accessing data and executing applications, and other components that facilitate communication over a network. The operations performed by client computing device 106 and/or by automated assistant 120 may be distributed across multiple computer systems. Automated assistant 120 may be implemented as, for example, computer programs running on one or more computers in one or more locations that are coupled to each other through a network.

As noted above, in various implementations, client computing device 106 may operate an automated assistant client 108, or "client portion" of automated assistant 120. In various implementations, automated assistant client 108 may include a speech capture module 110 and/or a visual cue module 112₁. In other implementations, one or more aspects of speech capture module 110 and/or visual cue module 112 may be implemented separately from automated assistant client 108, e.g., by one or more cloud-based automated assistant components 119. For example, in FIG. 1, there is also a cloud-based visual cue module 112₂ that may detect visual cues in image data.

In various implementations, speech capture module 110, which may be implemented using any combination of hardware and software, may interface with hardware such as microphone 109 or other pressure sensor to capture an audio recording of a user's utterance(s). Various types of processing may be performed on this audio recording for various purposes.

In various implementations, visual cue module 112₁ (and/or cloud-based visual cue module 112₂) may be implemented using any combination of hardware or software, and may be configured to analyze one or more image frames provided by vision sensor(s) 107 to detect one or more visual cues captured in and/or across the one or more image frames. Visual cue module 112₁ may employ a variety of techniques to detect visual cues. For example, visual cue module 112₁ (or 112₂) may use one or more artificial intelligence (or machine learning) models that are trained to generate output indicative of detected user-provided visual cues in image frames.

Client device 106 may have other applications installed as well, such as a web browser 111 and/or other miscellaneous application(s) 113. In various implementations, other miscellaneous application(s) 113 may provide an interface for a user to engage in typed or spoken human-to-computer dialog with automated assistant 120, as a one-on-one dialog or as a multi-participant dialog in which automated assistant 120 may "participate." In some implementations, web browser 111 and/or other miscellaneous application(s) 113 may be specially designed, e.g., with a microphone button or other user interface element that is operable to invoke automated assistant 120, so that the user is able to issue voice commands to aid in operation of those applications.

Speech capture module 110 may be configured to capture a user's speech, e.g., via a microphone 109, as mentioned previously. Additionally or alternatively, in some implementations, speech capture module 110 may be further configured to convert that captured audio to text and/or to other representations or embeddings, e.g., using speech-to-text ("STT") processing techniques (also referred to as "automatic speech recognition," or "ASR"). Additionally or alternatively, in some implementations, speech capture module 110 may be configured to convert text to computer-synthesized speech, e.g., using one or more voice synthesizers. However, in some cases, because client device 106 may be relatively constrained in terms of computing resources (e.g., processor cycles, memory, battery, etc.), speech capture module 110 local to client device 106 may be configured to convert a finite number of different spoken phrases—particularly phrases that invoke automated assistant 120—to text (or to other forms, such as lower dimensionality embeddings). Other speech input may be sent to cloud-based automated assistant components 119, which may include a cloud-based text-to-speech ("TTS") module 116 and/or a cloud-based STT module 117.

Cloud-based TTS module 116 may be configured to leverage the virtually limitless resources of the cloud to convert textual data (e.g., natural language responses formulated by automated assistant 120) into computer-generated speech output. In some implementations, TTS module 116 may provide the computer-generated speech output to client device 106 to be output directly, e.g., using one or more speakers. In other implementations, textual data (e.g., natural language responses) generated by automated assistant 120 may be provided to speech capture module 110, which may then convert the textual data into computer-generated speech that is output locally.

Cloud-based STT module 117 may be configured to leverage the virtually limitless resources of the cloud to convert audio data captured by speech capture module 110 into text, which may then be provided to intent matcher 135. In some implementations, cloud-based STT module 117 may convert an audio recording of speech to one or more phonemes, and then convert the one or more phonemes to text. Additionally or alternatively, in some implementations, STT module 117 may employ a state decoding graph. In some implementations, STT module 117 may generate a plurality of candidate textual interpretations of the user's utterance. In some implementations, STT module 117 may weight or bias particular candidate textual interpretations higher than others depending on whether there are contemporaneously detected visual cues.

Automated assistant 120 (and in particular, cloud-based automated assistant components 119) may include intent matcher 135, the aforementioned TTS module 116, the aforementioned STT module 117, and other components that are described in more detail below. In some implementations, one or more of the modules and/or modules of automated assistant 120 may be omitted, combined, and/or implemented in a component that is separate from automated assistant 120. In some implementations, to protect privacy, one or more of the components of automated assistant 120, such as natural language processor 122, TTS module 116, STT module 117, etc., may be implemented wholly or at least on part on client devices 106 (e.g., to the exclusion of the cloud).

In some implementations, automated assistant 120 generates responsive content in response to various inputs generated by a user of one of the client devices 106 during a human-to-computer dialog session with automated assistant 120. Automated assistant 120 may provide the responsive content (e.g., over one or more networks when separate from a client device of a user) for presentation to the user as part of the dialog session. For example, automated assistant 120 may generate responsive content in response to free-form natural language input provided via client device 106. As used herein, free-form natural language input is input that is formulated/composed by a user and that is not constrained to a group of options presented for selection by the user. Free form natural language input may be spoken (and captured by microphone 109) and/or typed.

As used herein, a "dialog session" may include a logically-self-contained exchange of one or more messages between a user and automated assistant 120 (and in some cases, other human participants). Automated assistant 120 may differentiate between multiple dialog sessions with a user based on various signals, such as passage of time between sessions, change of user context (e.g., location, before/during/after a scheduled meeting, etc.) between sessions, detection of one or more intervening interactions between the user and a client device other than dialog between the user and the automated assistant (e.g., the user switches applications for a while, the user walks away from then later returns to a standalone voice-activated product), locking/sleeping of the client device between sessions, change of client devices used to interface with one or more instances of automated assistant 120, and so forth.

An intent matcher 135 may be configured to determine a user's intent based on free-form natural language input(s) (e.g., vocal utterances, visual cues, etc.) provided by a user (or from automatically-generated or human-curated batches of free-form natural language inputs) and/or based on other signals, such as sensor signals, online signals (e.g., data obtained from web services), and so forth. In some implementations, intent matcher 135 may include a natural language processor 122 and the aforementioned cloud-based visual cue module 112$_2$. In various implementations, cloud-based visual cue module 112$_2$ may operate similarly to visual cue module 112$_1$ except that cloud-based visual cue module 112$_2$ may have more resources at its disposal. In particular, cloud-based visual cue module 112$_2$ may detect visual cues that may be used by intent matcher 135, alone or in combination with other signals, to determine a user's intent.

Natural language processor 122 may be configured to process free-form natural language input generated by user(s) via client device 106 and may generate annotated output (e.g., in textual form) for use by one or more other components of automated assistant 120. For example, the natural language processor 122 may process natural language free-form input that is generated by a user via one or more user interface input devices of client device 106. The generated annotated output includes one or more annotations of the natural language input and one or more (e.g., all) of the terms of the free-form natural language input.

In some implementations, the natural language processor 122 is configured to identify and annotate various types of grammatical information in free-form natural language input. For example, the natural language processor 122 may include a morphological module that may separate individual words into morphemes and/or annotate the morphemes, e.g., with their classes. Natural language processor 122 may also include a part of speech tagger configured to annotate terms with their grammatical roles. For example, the part of speech tagger may tag each term with its part of speech such as "noun," "verb," "adjective," "pronoun," etc. Also, for example, in some implementations the natural language processor 122 may additionally and/or alternatively include a dependency parser (not depicted) configured to determine syntactic relationships between terms in natural language input. For example, the dependency parser may determine which terms modify other terms, subjects and verbs of sentences, and so forth (e.g., a parse tree)—and may make annotations of such dependencies.

In some implementations, the natural language processor 122 may additionally and/or alternatively include an entity tagger (not depicted) configured to annotate entity references in one or more segments such as references to people (including, for instance, literary characters, celebrities, public figures, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities. For example, a "banana" node may be connected (e.g., as a child) to a "fruit" node," which in turn may be connected (e.g., as a child) to "produce" and/or "food" nodes. As another example, a restaurant called "Hypothetical Café" may be represented by a node that also includes attributes such as its address, type of food served, hours, contact information, etc. The "Hypothetical Café" node may in some implementations be connected by an edge (e.g., representing a child-to-parent relationship) to one or more other nodes, such as a "restaurant" node, a "business" node, a node representing a city and/or state in which the restaurant is located, and so forth.

The entity tagger of the natural language processor 122 may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

In some implementations, the natural language processor 122 may additionally and/or alternatively include a coreference resolver (not depicted) configured to group, or "cluster," references to the same entity based on one or more contextual cues. For example, the coreference resolver may be utilized to resolve the term "there" to "Hypothetical Café" in the natural language input "I liked Hypothetical Café last time we ate there."

In some implementations, one or more components of the natural language processor 122 may rely on annotations from one or more other components of the natural language processor 122. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, one or more components of the natural language processor 122 may use related prior input and/or other related data outside of the particular natural language input to determine one or more annotations.

Intent matcher 135 may use various techniques to determine an intent of the user, e.g., based on output from natural language processor 122 (which may include annotations and terms of the natural language input) and/or based on output from visual cue module (e.g., 112$_1$ and/or 112$_2$). In some implementations, intent matcher 135 may have access to one or more databases (not depicted) that include, for instance, a plurality of mappings between grammars, visual cues, and responsive actions (or more generally, intents). In many cases, these grammars may be selected and/or learned over time, and may represent the most common intents of users. For example, one grammar, "play <artist>", may be mapped to an intent that invokes a responsive action that causes music by the <artist> to be played on the client device 106 operated by the user. Another grammar, "[weather|forecast] today," may be match-able to user queries such as "what's the weather today" and "what's the forecast for today?"

In addition to or instead of grammars, in some implementations, intent matcher 135 may employ one or more trained machine learning models, alone or in combination with one or more grammars and/or visual cues. These trained machine learning models may also be stored in one or more databases and may be trained to identify intents, e.g., by embedding data indicative of a user's utterance and/or any detected user-provided visual cues into a latent space, and then determining which other embeddings (and therefore, intents) are most proximate, e.g., using techniques such as Euclidean distance, cosine similarity, etc.

As seen in the "play <artist>" example grammar, some grammars have slots (e.g., <artist>) that can be filled with slot values (or "parameters"). Slot values may be determined in various ways. Often users will provide the slot values proactively. For example, for a grammar "Order me a <topping> pizza," a user may likely speak the phrase "order me a sausage pizza," in which case the slot <topping> is filled automatically. Additionally or alternatively, if a user invokes a grammar that includes slots to be filled with slot values, without the user proactively providing the slot values, automated assistant 120 may solicit those slot values from the user (e.g., "what type of crust do you want on your pizza?"). In some implementations, slots may be filled with slot values based on visual cues detected by visual cue modules 112$_{1-2}$. For example, a user could utter something like "Order me this many cat bowls" while holding up three fingers to visual sensor 107 of client device 106. Or, a user could utter something like "Find me more movies like this" while holding of a DVD case for a particular movie.

Fulfillment module 124 may be configured to receive the predicted/estimated intent that is output by intent matcher 135, as well as an associated slot values (whether provided by the user proactively or solicited from the user) and carry out (or "resolve," or "fulfill") the intent. In various implementations, fulfillment (or "resolution" or "carrying out") of the user's intent may cause various fulfillment information (also referred to as "responsive" information or "resolution information") to be generated/obtained, e.g., by fulfillment module 124. As will be described below, the fulfillment information may in some implementations be provided to a natural language generator ("NLG" in some FIGS. 126, which may generate natural language output based on the fulfillment information. Also, in some implementations, fulfillment module 124 may be configured to execute scripts for automatically interacting with GUIs, which may be generated using techniques described herein.

Fulfillment (or "resolution") information may take various forms because an intent can be fulfilled (or "resolved") in a variety of ways. Suppose a user requests pure information, such as "Where were the outdoor shots of 'The Shining' filmed?" The intent of the user may be determined, e.g., by intent matcher 135, as being a search query. The intent and content of the search query may be provided to fulfillment module 124, which as depicted in FIG. 1 may be in communication with one or more search modules 150 configured to search corpuses of documents and/or other data sources (e.g., knowledge graphs, etc.) for responsive information. Fulfillment module 124 may provide data indicative of the search query (e.g., the text of the query, a reduced dimensionality embedding, etc.) to search module 150. Search module 150 may provide responsive information, such as GPS coordinates, or other more explicit information, such as "Timberline Lodge, Mt. Hood, Oregon." This responsive information may form part of the fulfillment information generated by fulfillment module 124.

Additionally or alternatively, fulfillment module 124 may be configured to receive, e.g., from intent matcher 135, a user's intent and any slot values provided by the user or determined using other means (e.g., GPS coordinates of the user, user preferences, etc.) and trigger a responsive action. Responsive actions may include, for instance, ordering a good/service, starting a timer, setting a reminder, initiating a phone call, playing media, sending a message, etc. In some such implementations, fulfillment information may include slot values associated with the fulfillment, confirmation responses (which may be selected from predetermined responses in some cases), etc.

Natural language generator 126 may be configured to generate and/or select natural language output (e.g., words/phrases that are designed to mimic human speech) based on data obtained from various sources. In some implementations, natural language generator 126 may be configured to receive, as input, fulfillment information associated with fulfillment of an intent, and to generate natural language output based on the fulfillment information. Additionally or alternatively, natural language generator 126 may receive information from other sources, such as third party applications (e.g., required slots), which it may use to compose natural language output for the user.

Various aspects of the present disclosure may be implemented in whole or in part by GUI navigation engine 128. In general, GUI navigation engine 128 may be configured to analyze GUIs in order to generate (and apply in some cases) scripts to automatically navigate through all or portions of these GUIs. These GUIs may take various forms. In some implementations, GUIs may be native and/or proprietary to miscellaneous application(s) 113. These types of application GUIs can take numerous forms and be written in numerous different programming languages.

Additionally or alternatively, in some implementations, GUIs may take the form of webpages that are written in various markup languages, such as the hypertext markup language ("HTML"), extensible HTML ("XHTML"), the extensible markup language ("XML"), and so forth. In some cases, webpages are associated with other types of documents that, for instance, impose styles on and/or add functionality to webpages. For example, cascading style sheets ("CSS") allow for description of a visual presentation of a markup language document, such as an HTML, XHTML, and/or XML document. In addition, many webpages may include and/or are linked to client-side code such as JavaScript that is executable at web browser 111 of client device 106 to facilitate local interactivity.

GUIs may include various types of interactive elements. Interactive elements may include but are not limited to radio buttons, toggle switches, check boxes, text input fields, drop down menus, sliders, and any other user interface element that is available, for instance, using technologies such as HTML, XML, CSS, JavaScript, etc., as well as GUI libraries and/or application programming interfaces ("APIs") available in various programming languages, such as C, C++, Java, Python, C#, etc.

GUI navigation engine 128 may have access to multiple databases and/or indexes, such as a webpage database 127. Webpage database 127 may include one or more databases of HTML, XHMTL, CSS, XML, PDF, or other documents that are generally available on the Internet using web browser 111 or other applications and are searchable, e.g., by search module 150, using various search engines (not depicted).

GUI navigation engine 128 also may have access to a database of scripts 129 that are generated using techniques described herein. Each script may be associated with a GUI, and may include instructions that are performable to automatically navigate through and/or interact with at least a portion of the GUI. As an example, a script may be generated in association with a webpage. When that webpage is rendered by web browser 111 of an automated assistant-equipped client device 106, automated assistant 120 may retrieve the script, e.g., in response to a user's free-form natural language input requesting interaction with the webpage. Automated assistant 120 and/or another component may execute the script to trigger automatic interaction with one or more interactive elements of the webpage.

As will be described in more detail shortly, in some implementations, scripts generated using techniques described herein may be "validated," e.g., by a human or automatically by GUI navigation engine 128 using techniques described herein. To "validate" a script means to determine that the script is capable of carrying out a particular intent or purpose of the interactive GUI corresponding to the script. The process of validating a script may occur periodically (e.g., every N seconds, minutes, hours, days, weeks, etc., wherein N is a positive integer), on demand, etc.

FIGS. 2A-D depict an example of how techniques described herein may be used to automatically interact with a GUI in the form of a webpage. These figures and other figures herein demonstrate both a "learning" phase—i.e., generation of a script that is usable subsequently to interact with the GUI—and an "application" phase—i.e. subsequent execution of such a script to trigger automatic interaction with the GUI. In FIGS. 2A-D and subsequent figures, disclosed techniques will be demonstrated using a client device 206 configured with selected aspects of the present disclosure, as it may be operated to interact with a hypothetical website, "feuxfilm.com." However, this is not meant to be limiting.

Figure 2B:
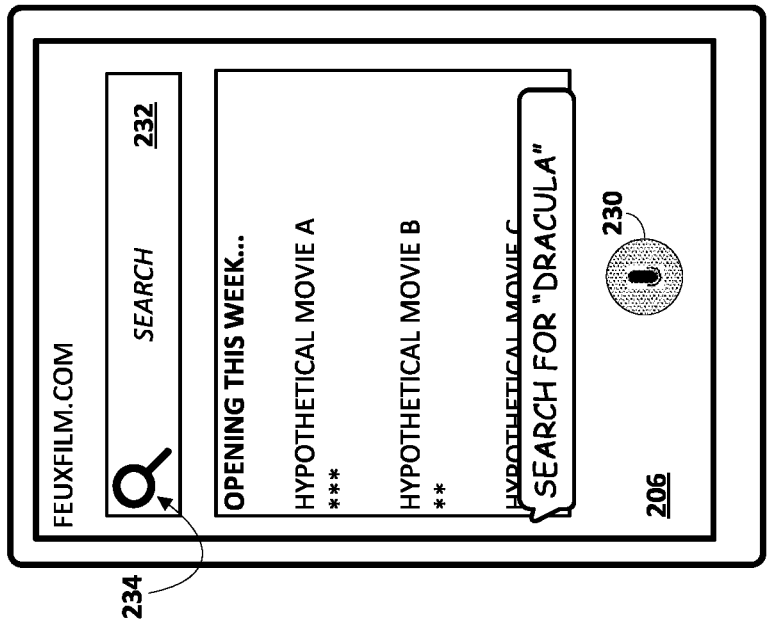
FIG. 2A, FIG. 2B, FIG. 2C, and FIG. 2D depict an example of how techniques described herein may be used to automatically interact with a GUI.
Figure 2A:
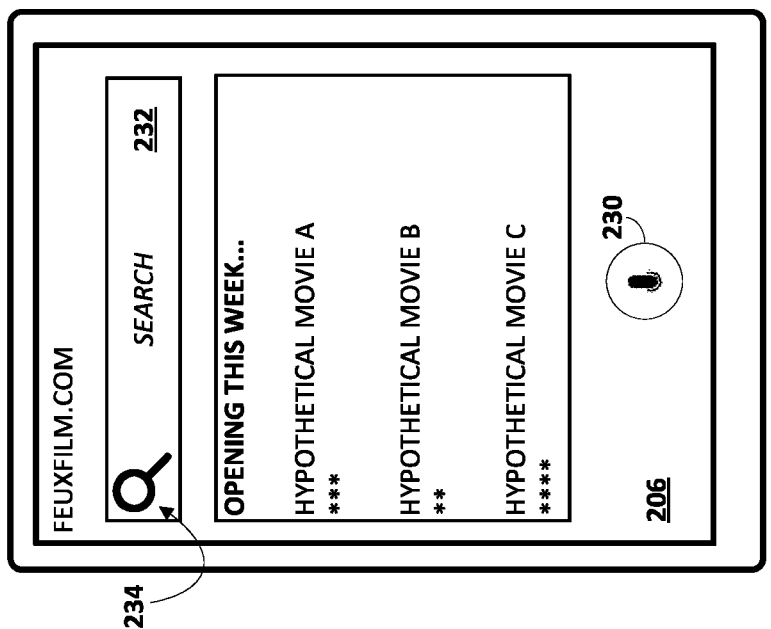

In FIG. 2A, client device 206 has been navigated to the website associated with the URL, feuxfilm.com. This may occur by a user typing that URL into a URL field, or by the user invoking automated assistant 120 (e.g., by pressing a microphone element 230) and requesting navigation to the website ("open feuxfilm.com"). In response to this request, in FIG. 2A, client device 206 loads a first webpage that serves as a "home" page for feuxfilms.com and includes, for instance, a list of movies opening this week and star ratings associated with those movies.

Also included on the webpage is a search bar 232 that is operable by the user to search documents associated with feuxfilm.com for keywords. As is common on webpages in particular and across GUIs in general, a visual cue 234 in the form of a magnifying glass icon is provided to draw the user's attention to the purpose of search field 232 (this may be beneficial if, for instance, the user doesn't speak English). In some cases, the search field may not include the word "SEARCH," as depicted in FIG. 2A, therefore making visual cue 234 even more useful.

In FIG. 2B, automated assistant 120 has been invoked (e.g., by a user pressing the microphone element 230 during the application phase, as indicated by its shading, or automatically during the training phase. The free-form natural language input, "search for Dracula," has been provided, e.g., by the user during the application phase or automatically during the training phase (e.g., selected from a batch of automatically-generated and/or human-curated free form natural language inputs). From this free-form input the user intent "search for" and the slot value "Dracula" are determined.

During the training phase, when there is no (validated) script available for automated assistant 120 to execute, techniques described herein may be employed to identify a target visual cue to be located in the GUI. In this example, the user intent is "search for," and the target visual cue is the magnifying glass icon (234) that is so frequently presented with search bars. As will be described in more detail shortly, in some implementations, a location of a detected instance of the target visual cue may be determined, e.g., using object recognition processing on a screenshot provided by client device 206. Based on the location of the detected instance of the target visual cue, an interactive element of the webpage may be identified. In FIGS. 2A-D, the location of target visual cue 234 (magnifying glass icon) can be associated spatially with search bar 232, e.g., using heuristics or other techniques.

Figure 2D:
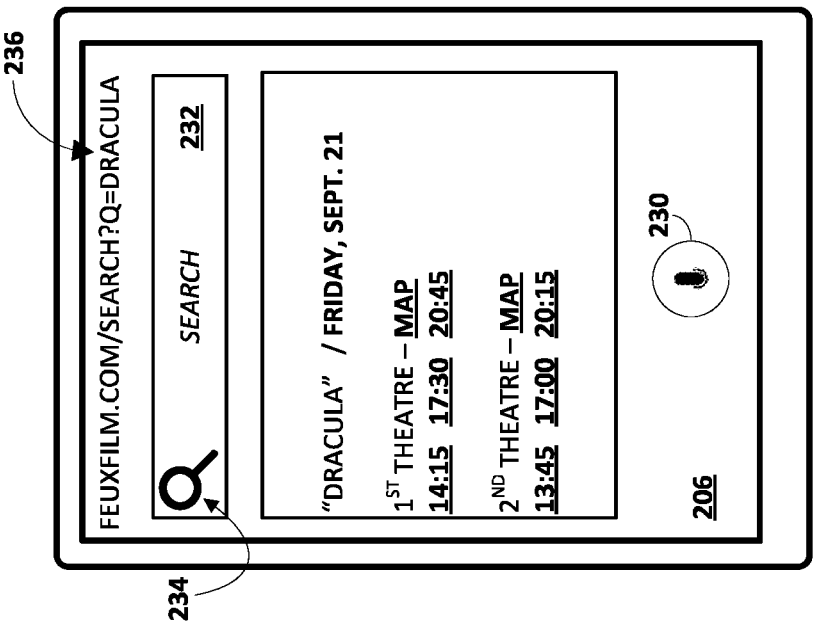
Figure 2C:
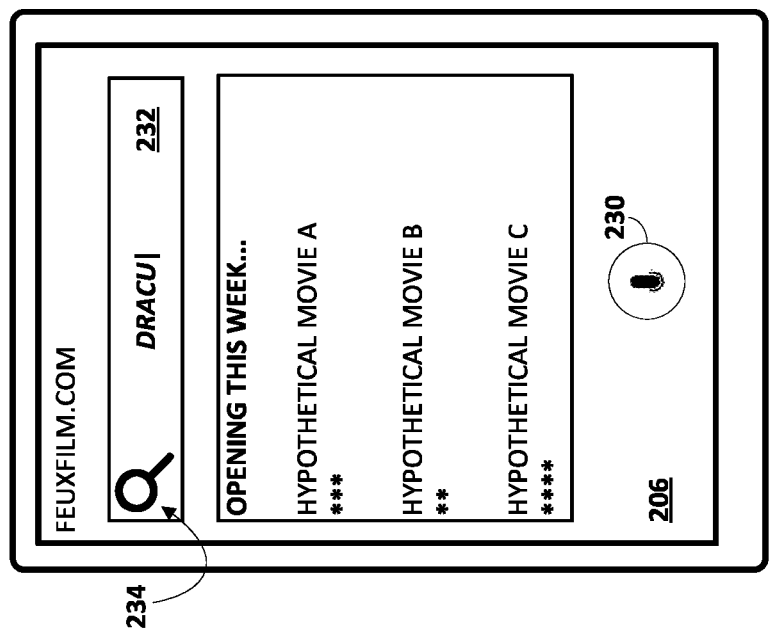

Once the interactive element (search bar 232) is identified, as is the case in FIG. 2C, the text "Dracula" from the free-form natural language input may be input automatically into search bar 232, e.g., without it being typed manually. When this occurs during the application phase, the user may see the search text being typed at a rate of speed that is perceptible to the user, e.g., so that the user can intuit what is happening. The search is then submitted automatically to yield the search results webpage depicted in FIG. 2D.

In FIG. 2D, search results for the movie "Dracula" are shown. These search results effectively comprise an outcome of the actions taken previously by automated assistant 120. During the training phase, the actions taken previously may be validated by analyzing various aspects of the outcome of FIG. 2D, e.g., in comparison with a desired outcome. For example, the URL 236 in FIG. 2D has been updated to reflect a current webpage (search) and to include the search term "Dracula." This may be used as a relatively strong signal that the intent of "search" and the slot value of "Dracula" were successfully resolved by automated assistant 120. Additionally or alternatively, in some implementations, other content of the webpage of FIG. 2D, such as the search results themselves, may be used as an outcome that can validate that the actions taken previously by automated assistant 120 were successful. During the application phase, by contrast, the user may be able to select various links depicted in FIG. 2D in order to advance towards their goal of procuring a ticket to the movie "Dracula."

Figure 3B:
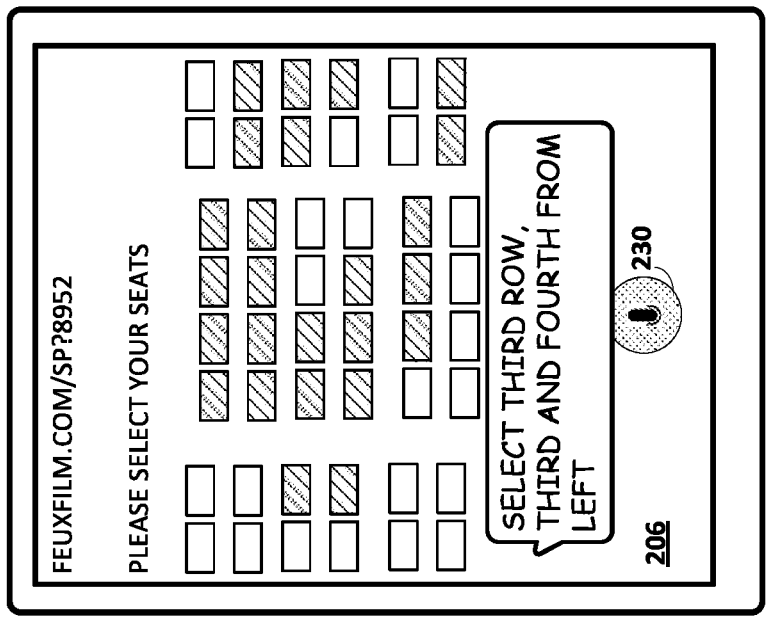
FIG. 3A, FIG. 3B, FIG. 3C, and FIG. 3D depict another example of how techniques described herein may be used to automatically interact with a GUI.
Figure 3A:
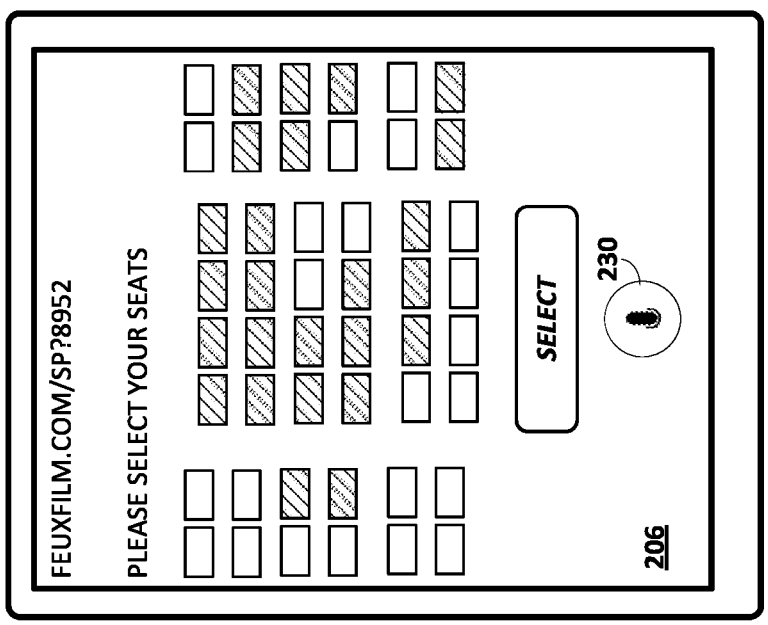

FIGS. 3A-D depict another example of how techniques described herein may be applied during the training or application phases for a webpage that allows a user to select seats. This example follows the previous example, after the user has selected a particular showing for the movie "Dracula" depicted in FIG. 2D. In FIG. 3A, the URL 236 is updated to include "SP?8952," which can be assumed to represent a "seat picker" ("SP") interface for the particular showing of "Dracula" the user selected in FIG. 2D (which is numbered 8952 in this example). The interface of FIG. 3A prompts a user to select an open seat. The white seats are open, and the shaded seats are already taken.

In FIG. 3B, microphone element 230 has been actuated to invoke automated assistant 120, and the query "Select third row, third and fourth from left" has been submitted. As was the case with the previous example and with other examples described herein, this action may be performed automatically as part of training (in which case the query may be randomly-generated or human-curated) or during application with an actual user interacting with the website.

Figure 3D:
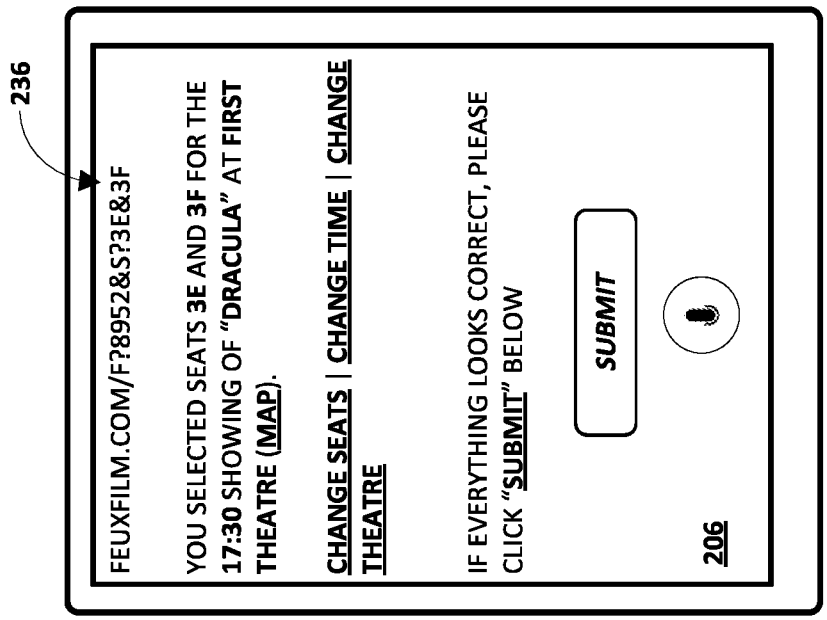
Figure 3C:
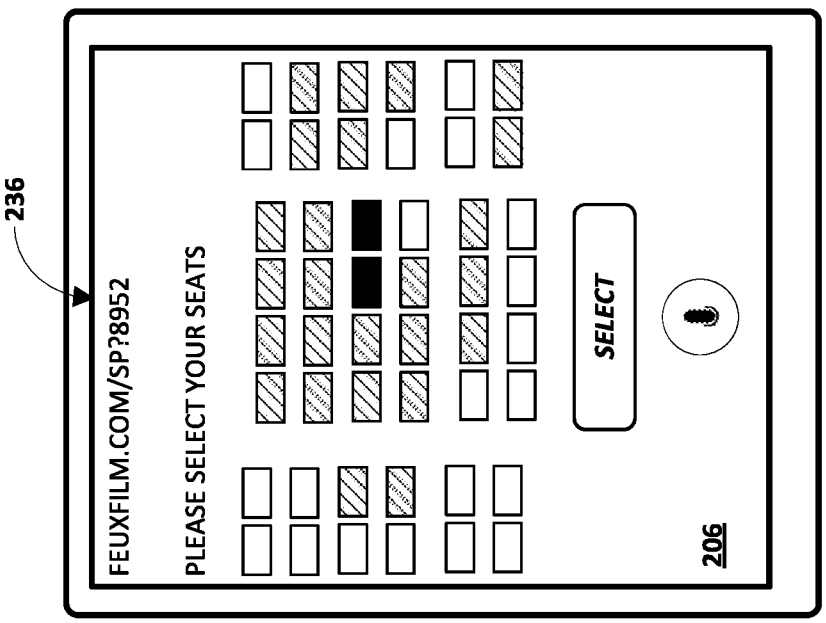

In FIG. 3C, the seats specified in the query submitted in FIG. 3B are selected, as shown in black. In some implementations, particularly during training, the visual cue that is targeted based on the user's query is a pattern associated with the movie theater seats. Although seating arrangements vary amongst different movie theaters, patterns may still emerge, and these patterns may be used as visual cues. For example, assuming the screen is at top, the visual cue associated with the current query may seats that are three rows back from the screen, and then three and four seats from the left.

In some implementations, the training and application phases may not necessarily be entirely distinct. In fact, in many implementations, training may occur even when a user interacts with a webpage in real time. If a script was executed to aid the user's interaction with the webpage, the script can be verified (or flagged as dysfunctional) based on various signals generated by subsequent webpages and/or by the user. In FIG. 3C, for instance, the user may be able to see that the correct seats were selected. In some cases, the user's actuation of the "SELECT" button after seeing those seats selected automatically may serve as a strong signal that the script operated properly.

If no script was used (e.g., because it hasn't been generated yet for this particular URL, or it was previously generated but the movie theater rearranged its seats, rendering the previous script obsolete), then techniques described herein relating to performing image processing on a screenshot to identify a location of a target visual cue (particular seats) in a screenshot may be performed in real time. If the user sees that the correct seats were selected and presses the "SELECT" button, that may be used as a positive example to train, for instance, an object recognition machine learning model that was applied to the screenshot to identify the requested seats. If the user selects different seats than those that were selected automatically, that may be a negative training example.

FIG. 3D depicts a next screen that may be presented to the user. The URL 236 has been updated so that the film ("F") 8952 remains active and the seats ("S") 3E and 3F are selected. As before, URL 236 can be used as a signal of the success or failure of a script that resulted in the interface of FIG. 3D (either during training or application). In FIG. 3D, the user is presented with a summary of their selection, some links that allow them to make changes, and a "SUBMIT" button. If the user changes seats, times, or theaters, that may be taken as a signal that a script (if available) didn't operate properly, or a signal that techniques described herein to identify a target visual cue's location didn't work properly (in which case no script should be generated). On the other hand, if the user presses "SUBMIT," the script and/or techniques may be validated.

A sought-after interactive element such as search bar 232 may not always be readily available on all webpages. Some websites may require users to click on an intermediate interactive element first, in order to expose a search bar. Additionally or alternatively, in some cases, a website may include a search interface on an intermediate menu that is rendered using client-side logic such as JavaScript code or other similar technology. Techniques described herein may nonetheless be employed to facilitate automatic interaction with these websites.

Figure 4B:
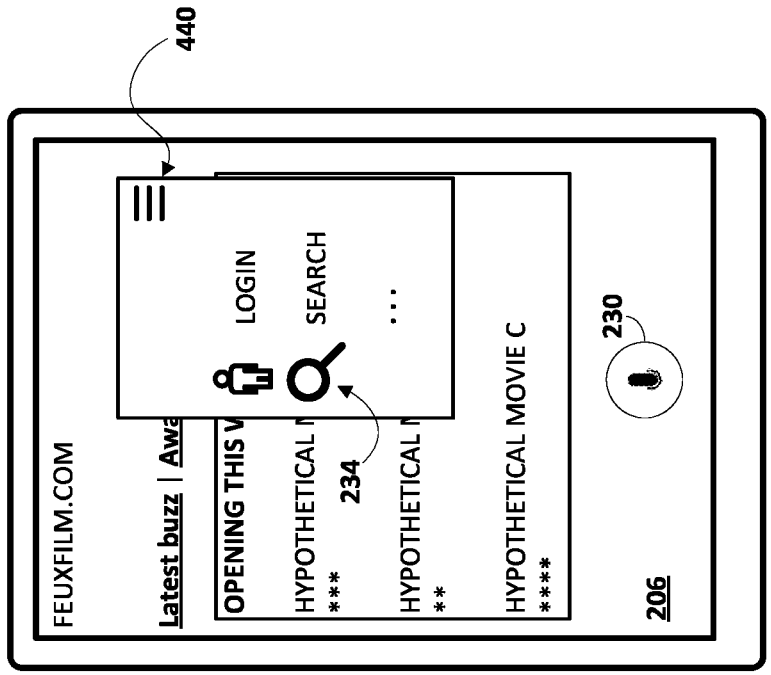
FIG. 4A, FIG. 4B, FIG. 4C, and FIG. 4D depict an example of how techniques described herein may be used to automatically interact with a GUI.
Figure 4A:
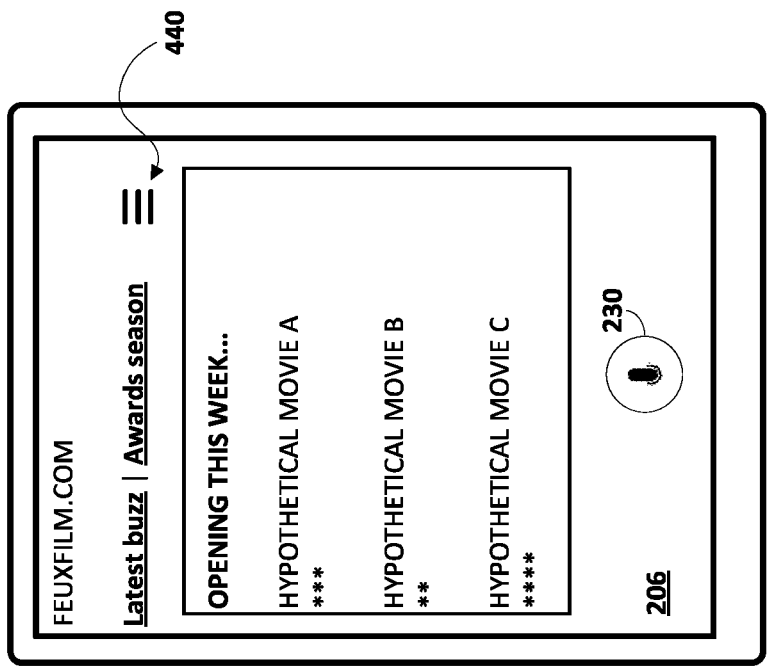
Figure 4D:
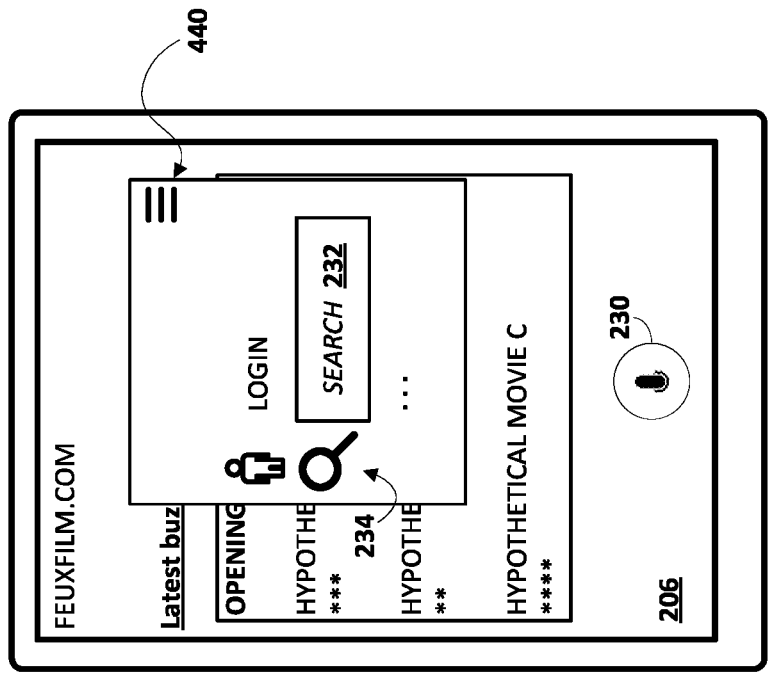
Figure 4C:
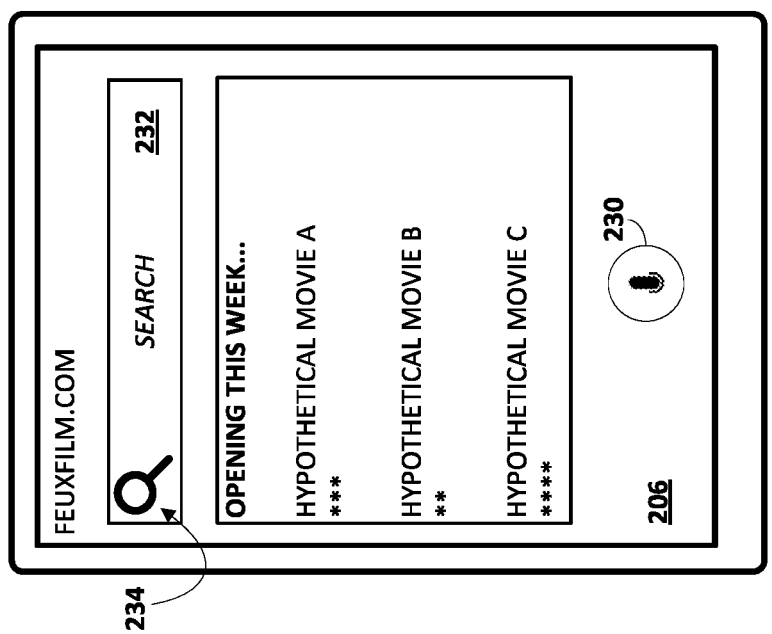

Turning now to FIGS. 4A-D, in FIG. 4A, an alternative version of the website associated with the URL "feuxfilm.com" is shown on a client device 206. There is no readily available search interface in FIG. 4A. Instead, there is an intermediate element that is commonly referred to as a "hamburger" graphical 440 that can be pressed to cause another menu to appear (other intermediate graphical elements are contemplated). For example, in FIG. 4B, hamburger icon 440 has been pressed to cause it to expand a menu and expose additional controls, including a "login" element and a search element that is identifiable visually based on visual cue 234. In some implementations, when the search element of FIG. 4B is actuated, the result may be the interface depicted in FIG. 4C, which adds a fully functional search bar 232. In other implementations, the menu that is exposed upon actuation of the hamburger graphical element 440 includes a fully functional search bar 232, as is depicted in FIG. 4D.

In various implementations, techniques described herein may be used to generate scripts for automatic navigation of a GUI such as those depicted in FIGS. 4A-D. For example, multiple visual cues may be identified and interacted with in succession in order to eventually expose a search bar that can be populated with data from a user intent. In some implementations, a single script may be generated that, for instance, locates and/or actuates a hamburger graphical element 440 to expose a next state of a GUI (e.g., using image processing of a screenshot as described herein). Then, another script may be generated to locate and interact with a search bar on the next state of the GUI, again using image processing of a screenshot as described herein.

Figure 5:
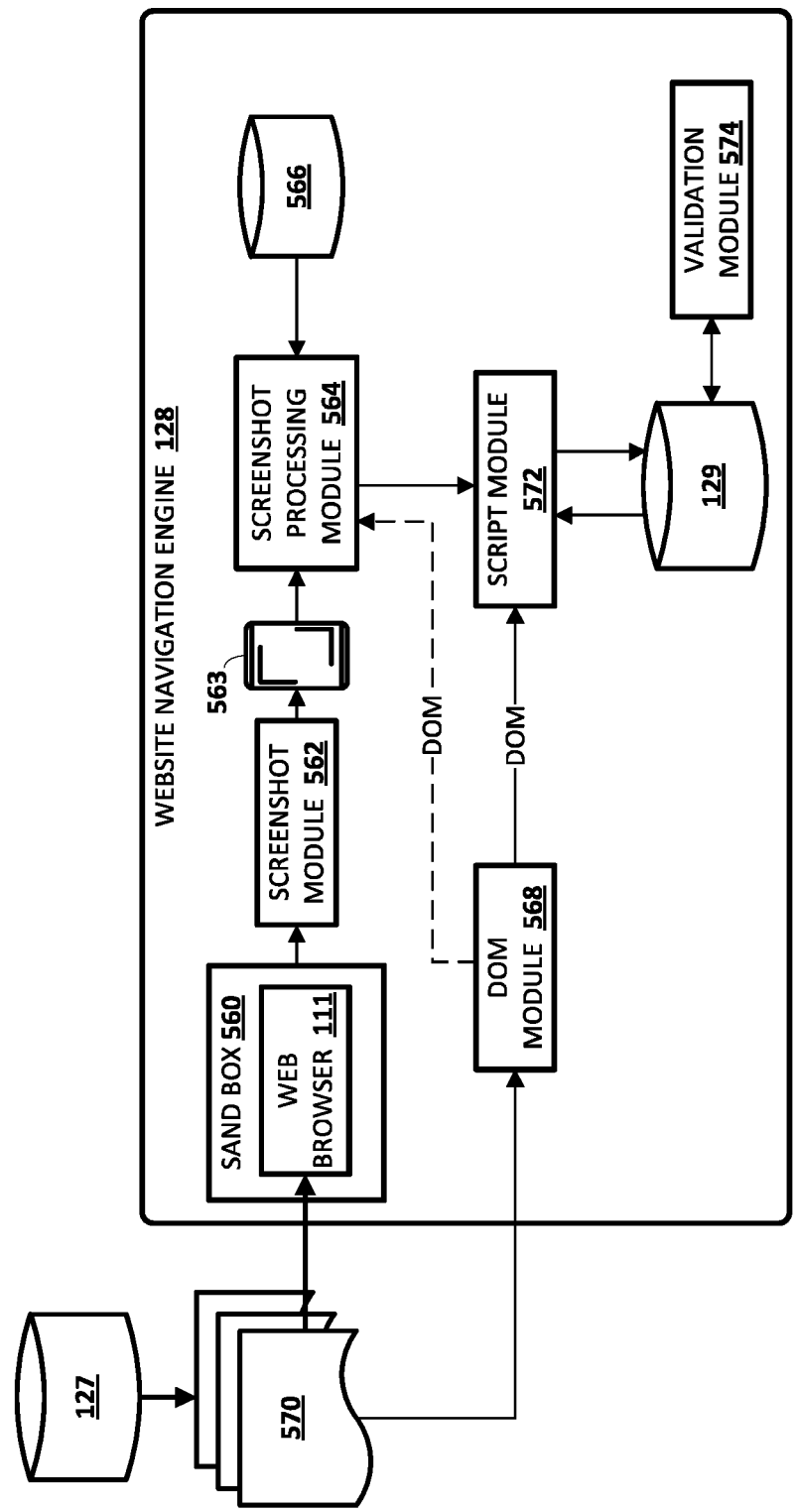
FIG. 5 schematically depicts one example of how techniques described herein may be used to generate scripts that can be used subsequently to automatically interact with GUIs, in accordance with various implementations.

FIG. 5 schematically depicts an example of how data may flow between and/or be processed by various components to implement selected aspects of the present disclosure, e.g., during the training phase to generate scripts for automatically interacting with GUIs. A plurality of GUIs 570 (e.g., individual webpages, states of application GUIs, etc.) are provided to and/or retrieved by website navigation engine 128, e.g., from website database 127.

In some implementations, website navigation engine 128 may include and/or operate one or more sand boxes 560, which may include areas or memory that are cordoned off from others for security and/or safety purposes. For example, a sand box 560 could be implemented as a virtual machine that includes its own operating system. In some implementations, sand box 560 includes one or more instances of a web browser 111 that can be used to during the training phase to attempt to automatically interact with webpages in accordance with free-form natural language inputs (which may be human-curated and/or automatically generated). Although not shown in FIG. 5, in some implementations, other non-web-browser applications may be implemented in sand box 560 in order to generate scripts for automatic interaction with other types of GUIs besides webpages.

In FIG. 5, web browser 111 is operated to interact with GUIs 570, which allows a screenshot module 562 to generate one or more screenshots 563. These screenshots 563 may then be processed by a screenshot processing module 562 in various ways. In some implementations screenshot processing module 564 may have access to a database 566 of machine learning model(s) that are trained to identify particular visual cues in screenshots 563, and to provide output indicative of, for instance, the location of detected instances of those visual cues within screenshot 563. This output may be provided in some implementations to a script module 572. The machine learning models employed by screenshot processing module 564 may take various forms, including but not limited to various forms of neural networks, such as convolutional neural networks (which are particularly well-suited for image processing).

The location of the detected instance of the target visual cue provided by screenshot processing module 564 may take various forms. In some implementations the location may take the form of a bounding box that captures or envelopes a detected instance of a target visual cue. Additionally or alternatively, in some implementations, screenshot processing module 564 may annotate a screenshot, e.g., with pixel-wise probabilities that each pixel renders a portion of a target visual cue. In other implementations, screenshot processing module 564 may provide a location (e.g., x,y coordinates) of a particular part of a target visual cue, such as its center, top-left corner, top-right corner, etc.

Script module 572 may be configured to process the location provided by screenshot processing module 564, along with other data about the GUI under consideration, and generate a script that is usable subsequently to automatically interact with the GUI. In FIG. 5, a DOM module 568 may be configured to obtain/extract, from GUIs 570, underlying DOM information. In some implementations, the operations performed by DOM module 568 may be performed in whole or in part by web browser 111.

The DOM information provided by DOM module 568 to script module 572 may be used by script module 572, in conjunction with the location of the detected instance of the target visual cue, to identify a particular interactive element of the GUI that is associated with the detected instance of the target visual cue. In some implementations, CSS selectors in the DOM data may be searched based on a user intent being used to generate the script. For example, if the user intent is to "search," then a CSS selector for "search," "find," or some other semantically-similar token may be identified and matched to the location provided by screenshot processing module.

As indicated by the dashed arrow in FIG. 5, in other implementations, DOM module 568 may provide the DOM data directly to screenshot processing module 564, rather than to script module 572. This may be the case, for instance, where screenshot processing module 564 is configured to provide output other than a spatial location of an interactive element that corresponds to a target visual cue. For example, in some implementations, screenshot processing module 564 may apply features of the DOM data as input across one or more machine learning models that are used in conjunction with the image processing machine learning model. The output generated based on these model(s) may include, for instance, one or more candidate DOM elements that may correspond to a detected instance of the target visual cue.

For example, suppose the user intent is to search, and the target visual cue is a magnifying glass. Screenshot processing module 564 may apply feature(s) of the screenshot 563 and the DOM data as inputs across one or more machine learning models. The output may include a list of DOM elements that are ranked based on the probability that they correspond to the user intent of search, as well as to a location within the screenshot 563 at which a detected instance of the magnifying glass icon was identified. In many cases one DOM element will be ranked far higher than others (e.g., where there is a single search bar on the GUI).

Script module 572 may be configured to generate scripts based on data it receives from screenshot processing module 564, and from other sources as applicable. Scripts it generates may be stored in database of scripts 129. In various implementations, a validation module 574 may periodically and/or on demand cause scripts in database 129 to be executed, e.g., in order to validate those scripts as still functional. This may occur daily, weekly, monthly, etc. In some implementations, GUIs that are more popular and/or that are known to change more frequently may be validated more often than other, less popular and/or less dynamic GUIs.

For example, validation module 574 may retrieve a script from database 129, and cause web browser 111 to retrieve the corresponding GUI 570 (e.g., a webpage associated with the same URL as the script) and execute the script on the retrieved GUI 570 using a human-curated or automatically generated free-form natural language input. Validation module 574 may validate an outcome of the script's execution by, for instance, searching a resulting URL for terms extracted from the free-form natural language input (e.g., as might be found in the user intent that results from the free-form natural language input). If the outcome is successful, or if some threshold percentage of outcomes obtained by executing the script numerous times are successful, the script may be retained in database 129 for future use.

Figure 6:
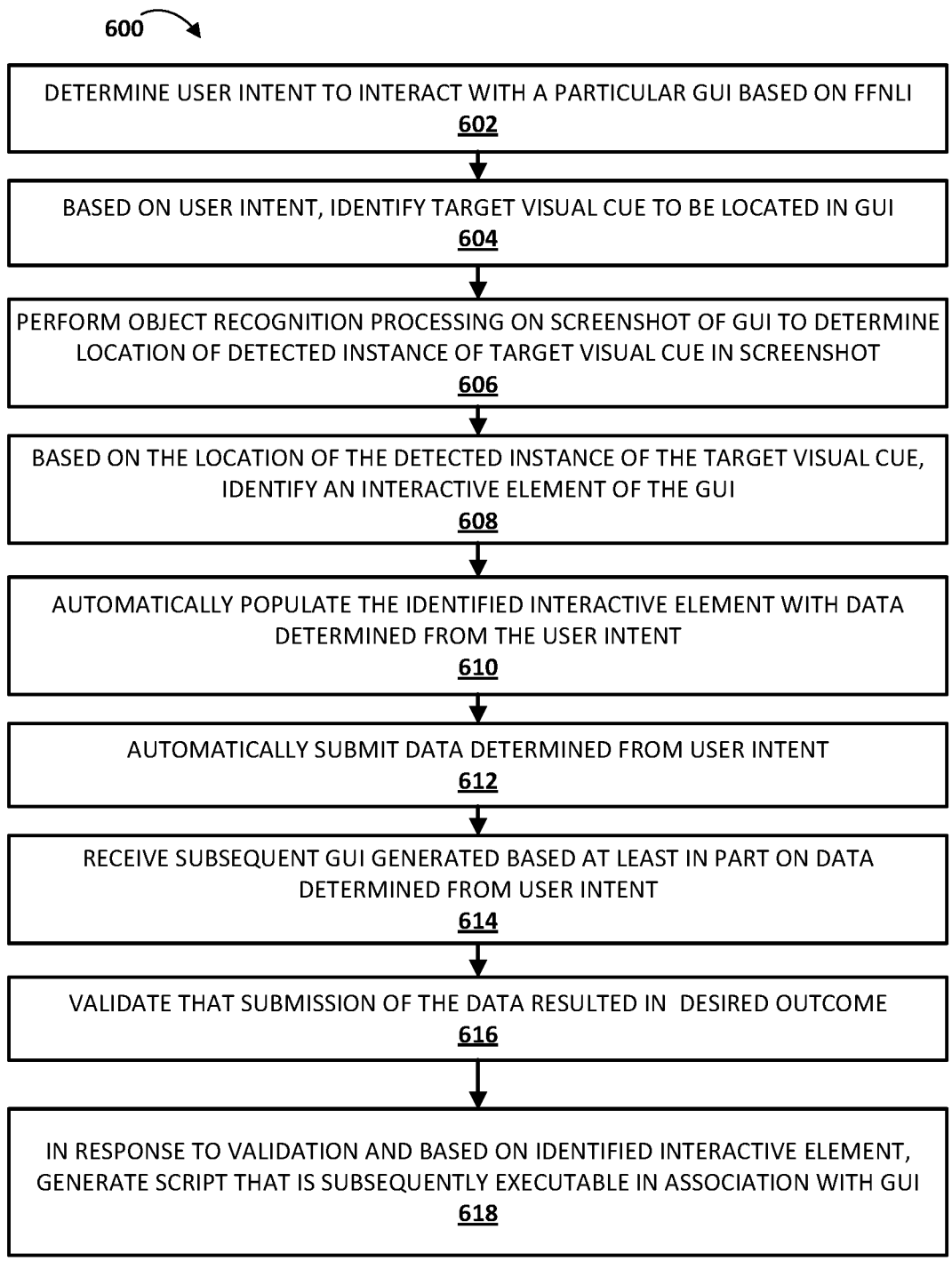
FIG. 6 depicts a flowchart illustrating an example method according to implementations disclosed herein.

FIG. 6 is a flowchart illustrating an example method 600 according to implementations disclosed herein. For convenience, the operations of the flow chart are described with reference to a system that performs the operations. This system may include various components of various computer systems, such as one or more components of automated assistant 120 and/or GUI navigation engine 128. Moreover, while operations of method 600 are shown in a particular order, this is not meant to be limiting. One or more operations may be reordered, omitted or added. The operations of FIG. 6 will be described in the context of generating scripts during the training phase. However, it should be understood that some of these operations may also be performed during the application phase, e.g., to validate a just-executed script.

At block 602, the system may determine a user intent to interact with a particular GUI based at least in part on a free-form natural language input. As should be clear, the term "user intent" as used herein is not limited to an actual intent of an actual user in real time. Rather, the term "user intent" refers to a collection of data, such as a data structure, that is generated, e.g., by intent matcher 135 in FIG. 1, from processing a free-form natural language input. The free-form natural language input may be human-curated and/or automatically generated. For example, a list of test search queries could be generated, with the first portion being "search for" and then follow-up terms being selected randomly from a dictionary and used as slot values.

Based on the user intent determined at block 602, at block 604, the system may identify a target visual cue to be located in the GUI. For example, if the user intent is to "search," then a magnifying glass visual cue may be identified. If the user intent is to select a seat, then a visual cue may take the form of an arrangement of seats (or icons representing seats) in a GUI that allows for picking of seats. If the user intent is to select a destination (e.g., from a travel website), the visual cue may take the form of a bed icon. If the user intent is to select dates, the visual cue may take the form of a calendar icon or an arrangement of fields often provided to enable input of dates. If the user intent is to select a number of people (e.g., number of guests for hotel room), or if the user intent is to log in to an account, the visual cue may take the form of an icon that depicts a bust (head, shoulders, part of chest) of a faceless person. In some implementations, optical character recognition ("OCR") processing may be performed on the screenshot, and the user intent may be matched to text output of the OCR processing.

At block 606, the system, e.g., by way of screenshot processing module 564, may perform object recognition processing on a screenshot of the GUI to determine a location of a detected instance of the target visual cue in the screenshot. For example, screenshot processing module 564 may apply data indicative of the screenshot as input across one or more machine learning models, alone or in combination with other data (e.g., features of a DOM), to generate output. This output may be indicative of, for instance, x,y coordinates of the detected instance of the target visual cue, and may take various forms, such as a bounding box, annotated pixel-wise probabilities, etc.

Based on the location of the detected instance of the target visual cue determined at block 606, at block 608, the system may identify an interactive element of the GUI. For example, script module 572 may analyze the DOM data to determine where on a display each DOM element would likely be displayed. Those locations may then be compared to the location of the detected instance of the target visual cue. Various heuristics may be applied to determine which interactive element (e.g., corresponding to a DOM element) is closest to, and therefore most likely associated with, the detected instance of the target visual cue.

At block 610, the system may automatically populate the identified interactive element with data determined from the user intent. For example, if the user intent is to "search," and the parameters of the search are "energy-efficient dishwashers," then "energy-efficient dishwashers" may be input into a search bar. If the user intent is to "select a date," and the slot-values are {month=December, day=16, year=2020), then an interactive calendar date picking element may be automatically interacted with to select the appropriate date.

In some implementations, at block 612, the system may automatically (e.g., without a user instruction) submit the data determined from the user intent (as it was used to populate the interactive element), e.g., by automatically actuating a "SUBMIT" button or other similar interface element. If the GUI under question is a webpage, in some cases, the submission may cause HTTP data to be submit to a web server, which can then generate the next webpage based at least in part on the data from the user intent.

At block 614, the system may receive (e.g., retrieve, obtain) a subsequent GUI generated based at least in part on the data determined from the user intent. As noted above, in some implementations, this next GUI may be the next webpage generated based at least in part on the HTTP data that included the data from the user intent. At block 616, the system, e.g., by way of validation module 574, may validate that submission of the data at block 612 resulted in a desired outcome. For example, the system may search for terms from the user intent in a URL of the next webpage. As another example, the system may analyze content of the next webpage to determine whether the terms from the user intent are present or otherwise represented.

In response to the validation of block 616 and based on the identified interactive element, at block 618, the system may generate a script that is subsequently executable in association with the same GUI. In some implementations, the script may be stored in database 129 in association with the URL. The script may take various forms and be written in various languages, including but not limited to JavaScript.

Figure 7:
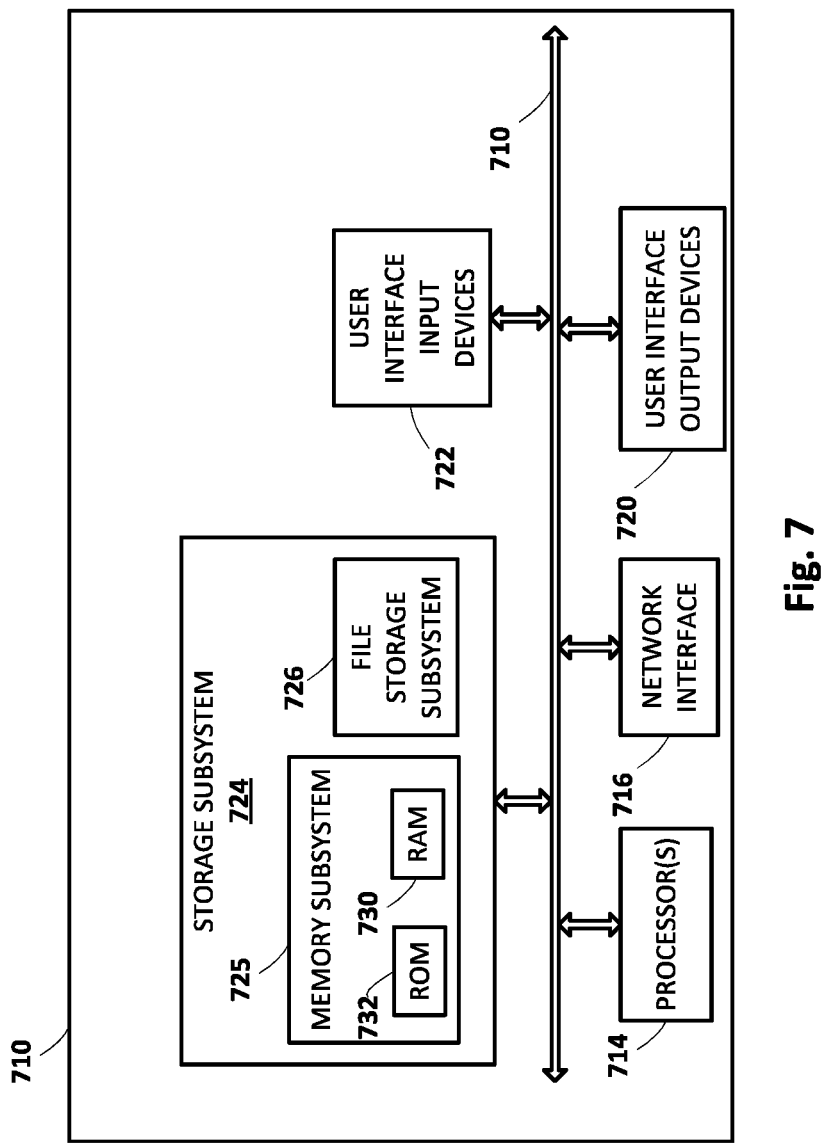
FIG. 7 illustrates an example architecture of a computing device.

FIG. 7 is a block diagram of an example computing device 710 that may optionally be utilized to perform one or more aspects of techniques described herein. In some implementations, one or more of a client computing device, GUI navigation engine 78, automated assistant 70, and/or other component(s) may comprise one or more components of the example computing device 710.

Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of the method of FIG. 6, as well as to implement various components depicted in FIGS. 1 and 5.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD- ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors, comprising:
    identifying a target visual cue to be located in a graphical user interface ("GUI") comprising an interactive webpage accessible at a uniform resource locator ("URL"), wherein the interactive webpage comprises one or more interactive elements;
    obtaining a document object model (DOM) of the interactive webpage, wherein the DOM of the interactive webpage comprises one or more interactive elements;
    obtaining a bitmap screenshot of the GUI;
    performing object recognition processing on the bitmap screenshot of the GUI to generate output indicative of a location of a detected instance of the target visual cue in the bitmap screenshot;
    based on the location of the detected instance of the target visual cue, applying features of the bitmap screenshot and the DOM as inputs across a machine learning model to generate output;
    based on the output, identifying one or more of the interactive elements of the GUI as corresponding to the target visual cue;
    automatically populating the one or more identified interactive elements with data;
    validating that submission of the data resulted in a next state of the interactive webpage; and
    in response to the validating, generating, and storing in association with the URL of the interactive webpage, a script that is subsequently executable in association with the interactive webpage and a subsequent free-form natural language input to trigger subsequent automatic population of the one or more identified interactive elements with data determined from a subsequent user intent determined from the subsequent free-form natural language input.

2. The method of claim 1, wherein the next state comprises a subsequent webpage that is generated at least in part on the data used to automatically populate the one or more identified interactive elements.

3. The method of claim 2, wherein the validating comprises searching a URL of the subsequent webpage to determine the next state.

4. The method of claim 3, wherein the method further includes training the machine learning model based on the outcome of the validating.

5. The method of claim 1, wherein the machine learning model comprises a convolutional neural network.

6. The method of claim 1, wherein the target visual cue comprises a magnifying glass.

7. The method of claim 1, wherein the subsequent automatic population is performed without one or more of identifying the target visual cue, performing the object recognition, or identifying the one or more interactive elements of the GUI.

8. A system comprising one or more processors and memory storing instructions that, in response to execution of the instructions by the one or more processors, cause the one or more processors to:
    identify a target visual cue to be located in a graphical user interface ("GUI") comprising an interactive webpage accessible at a uniform resource locator ("URL"), wherein the interactive webpage comprises one or more interactive elements;
    obtain a document object model (DOM) of the interactive webpage, wherein the DOM of the interactive webpage comprises one or more interactive elements;
    obtain a bitmap screenshot of the GUI;
    perform object recognition processing on the bitmap screenshot of the GUI to generate output indicative of a location of a detected instance of the target visual cue in the bitmap screenshot;
    based on the location of the detected instance of the target visual cue, apply features of the bitmap screenshot and the DOM as inputs across a machine learning model to generate output;
    based on the output, identify one or more of the interactive elements of the GUI as corresponding to the target visual cue;
    automatically populate the one or more identified interactive elements with data;
    validate that submission of the data resulted in a next state of the interactive webpage; and
    in response to the validation, generate, and store in association with the URL of the interactive webpage, a script that is subsequently executable in association with the interactive webpage and a subsequent free-form natural language input to trigger subsequent automatic population of the one or more identified interactive elements with data determined from a subsequent user intent determined from the subsequent free-form natural language input.

9. The system of claim 8, wherein the next state comprises a subsequent webpage that is generated at least in part on the data used to automatically populate the one or more identified interactive elements.

10. The system of claim 9, wherein the instructions to validate comprise instructions to search a URL of the subsequent webpage to determine the next state.

11. The system of claim 10, further comprising instructions to train the machine learning model based on the outcome of the validating.

12. The system of claim 8, wherein the machine learning model comprises a convolutional neural network.

13. At least one non-transitory computer-readable medium comprising instructions that, in response to execution by one or more processors, cause the one or more processors to:
- identify a target visual cue to be located in a graphical user interface ("GUI") comprising an interactive webpage accessible at a uniform resource locator ("URL"), wherein the interactive webpage comprises one or more interactive elements;
- obtain a document object model (DOM) of the interactive webpage, wherein the DOM of the interactive webpage comprises one or more interactive elements;
- obtain a bitmap screenshot of the GUI;
- perform object recognition processing on the bitmap screenshot of the GUI to generate output indicative of a location of a detected instance of the target visual cue in the bitmap screenshot;
- based on the location of the detected instance of the target visual cue, apply features of the bitmap screenshot and the DOM as inputs across a machine learning model to generate output;
- based on the output, identify one or more of the interactive elements of the GUI as corresponding to the target visual cue;
- automatically populate the one or more identified interactive elements with data;
- validate that submission of the data resulted in a next state of the interactive webpage; and
- in response to the validation, generate, and store in association with the URL of the interactive webpage, a script that is subsequently executable in association with the interactive webpage and a subsequent free-form natural language input to trigger subsequent automatic population of the one or more identified interactive elements with data determined from a subsequent user intent determined from the subsequent free-form natural language input.

14. The at least one non-transitory computer-readable medium of claim 13, wherein the next state comprises a subsequent webpage that is generated at least in part on the data used to automatically populate the one or more identified interactive elements.

15. The at least one non-transitory computer-readable medium of claim 14, wherein the instructions to validate comprise instructions to search a URL of the subsequent webpage to determine the next state.

16. The at least one non-transitory computer-readable medium of claim 15, further comprising instructions to train the machine learning model based on the outcome of the validating.

17. The at least one non-transitory computer-readable medium of claim 13, wherein the machine learning model comprises a convolutional neural network.

* * * * *